United States Patent Office 2,764,598
Patented Sept. 25, 1956

2,764,598
CHEMICAL PROCESS

Robert B. Egbert, Roslyn Heights, N. Y., assignor to Chempatents, Inc., New York, N. Y., a corporation of Delaware No Drawing. Application July 18, 1955,
Serial No. 522,871

8 Claims. (Cl. 260—348.5)

This invention relates to processes for the preparation of ethylene oxide by the partial oxidation of ethylene by means of gaseous oxygen in the presence of silver containing catalysts, and more particularly, to such a process wherein a gaseous reaction mixture of ethylene and oxygen is passed through a reaction zone at a temperature in the range of about 150 to 400° C., which zone contains catalyst particles of a refractory support carrying active silver, which catalyst particles are substantially equivalent in size and all of said particles in any cross-sectional region of the reaction zone are of substantially equal activity, but the activity of the catalyst particles is such that the zone is of increasing catalytic activity in the direction of travel of the gaseous reaction mixture through the reaction zone.

The preparation of ethylene oxide by the catalytic oxidation of ethylene is known, and has achieved noteworthy commercial success. Generally, such processes involve the reaction of oxygen with relatively pure ethylene diluted with inert gas, at temperatures of about 150 to 400° C. in the presence of active silver catalysts. The catalytic material may be coated upon the wall of the reaction vessel, or upon metal rods or tubes, or may be formed into pellets, e. g., of 2.5 mm. thickness and 5 mm. diameter, or it may be coated upon or mixed with a support material, such as granular supporting material screened to a convenient size, such as 3 to 8 mesh (Standard Screen Scale; openings about 6.7 to 2.4 mm.).

Inasmuch as the reaction of forming the ethylene oxide is exothermic, means must be provided for removing the heat evolved by the reaction in order to regulate the reaction temperature. This is especially critical in a selective partial oxidation of this type, since the elevation of the reaction temperature is reflected in an increase in the rate of the undesirable total combustion reaction. The latter reaction is also exothermic, and to a much larger extent than the above-mentioned desired reaction. Thus, it is apparent that the increase in the latter reaction due to a slight elevation of reaction temperature will tend rapidly to raise the temperature so that only carbon dioxide and hydrogen are obtained via the undesirable total combustion reaction. This undesirable occurrence is referred to as formation of "hot spots."

The discoveries associated with the invention related to solution of the above problems and the objects achieved in accordance with the invention as set forth herein include: the provision of a process for preparing ethylene oxide by the partial oxidation of ethylene with molecular oxygen in the presence of silver containing catalyst particles, wherein the catalytic activity across the reaction zone is substantially equal, but the catalytic activity increases along the reaction zone in the direction of flow of a gaseous mixture; the provision of such a process wherein the catalyst is arranged in a plurality of sub-zones of different activity, which sub-zones are arranged in order of increasing activity; and other objects which will be apparent as details or embodiments of the invention are set forth hereinafter.

In order to facilitate a clear understanding of the invention, the following preferred specific embodiments are described in detail.

EXAMPLE 1

A reactor containing a plurality of substantially vertical stainless steel tubes of about 0.867 inch diameter and about 23 feet in height, surrounded by a temperature regulating bath, such as diphenyl ether or a hydrogenated or partially hydrogenated aromatic material or the like, is filled to a 20 foot depth per tube with a silver containing catalyst.

This catalyst is prepared by mixing an aqueous solution of silver nitrate with a slight stoichiometric excess of aqueous sodium hydroxide, settling, and thoroughly washing the silver oxide precipitate. This is slurried in water. If desired, an acidic aqueous solution of calcium lactate or barium lactate is used instead of water (the pH thereof being in the range of about 4 to 6.5), to provide about 5 to 12% of calcium or barium by weight relative to the atoms of silver therein. Approximately ⅜ inch spheres of ceramically bonded fused alumina having a roughened outer surface and a surface area in the range of 0.002 to 10 square meters per gram, freshly washed with water, are then added to the above slurry mixture. The resulting mixture is evaporated slowly, with slow stirring, until each sphere is well coated with the slurry. The coated spheres are dried, e. g., at about 105 to 110° C. for about 4 to 10 hours, and then roasted at about 330 to 400° C. for about 1 to 5 hours in the presence of air or inert gas such as nitrogen. There is no need of a reducing gas atmosphere in this step.

Separate batches are prepared of the catalyst to provide the following composition:

Table I

| Catalyst | Wgt. Percent Ag | Wgt. Percent BaO |
|---|---|---|
| Full strength | 14.5 | 1.3 |
| Three-quarter strength | 10.9 | .98 |
| Half strength | 7.25 | .65 |

The tube is packed so that the inlet (top) contains a 3 foot length of uncoated support spheres, the next 4 foot section is packed with half strength catalyst, the next 5 foot section is packed with three-quarter strength catalyst, and the final 8 foot section is packed with full strength catalyst.

The reaction mixture containing about 4% ethylene and 6–8% oxygen passes through such a tube at a temperature of 258 to 276° C. and an inlet pressure of 140 p. s. i. g. (pounds per square inch gage) with recycling of gases from which ethylene oxide product has been separated at a rate of 500 cubic feet per hour (measured at atmospheric pressure and about 20° C.) and gives a maximum concentration of ethylene oxide in the outlet of 1.40% by volume.

In a comparable run wherein the tube was filled similarly except that full strength catalyst was used throughout the catalytic zone thereof, the maximum ethylene oxide obtainable is 1.17%. This result is indeed surprising, especially when one considers that the latter run employed a higher total amount of silver catalyst.

In a comparable graded catalyst arrangement run wherein the catalyst concentrations used per particle are exactly double, but for each coated catalyst particle there is inserted in each zone an uncoated particle, the maximum concentration of ethylene oxide obtainable is about 0.6%. This result is indeed noteworthy, especially in view of suggestions made heretofore that use of catalyst particles surrounded by inert particles should give improved results. If the above-mentioned procedure is followed, except increasing the catalyst concentration per particle to four times that mentioned in the above table, but adding in each zone for each coated particle 3 uncoated support particles arranged in regular alternate fashion or in random distribution, the maximum concentration of ethylene oxide obtainable is even lower, down to the order of about 0.3%.

This invention has been described with reference to a specific catalyst and arrangement of the catalyst in the reactor. It is to be understood that the invention is not limited to a silver catalyst prepared by a particular method, but lies broadly in the provision of a catalyst chamber in which the activity of the catalyst increases in the direction of travel of the reaction gases. A silver catalyst promoted with a barium salt has been described for illustration of this invention, but the invention contemplates use of silver catalyst promoted with other compounds.

The preferred alumina spheres are ceramically bonded fused alpha alumina particles having the following physical properties (ASTM method):

| | | |
|---|---|---|
| Porosity | percent vol | 41–45 |
| Water absorption | percent wt | 20–23 |
| Bulk density (indiv. support) | gr./cc | 2.1–1.9 |
| Surface area (nitrogen absorption) sq. m./gr | | 0.025–0.057 |

Corresponding calcium or the like alkyl and earth carboxylate promoted catalysts also give comparable desirable results. Although spherical catalysts are preferred, where are the advantages thereof are not required irregular type supports or supported catalysts may be used. Other suitable carriers are magnesia, zirconia, corundum and mullite.

Comparable results to the foregoing are achieved with various modifications thereof, such as the following. The reaction zone diameter may be in the range of about 0.5 to 2 inches; the spherical catalyst particles may be of a diameter of at least about 0.2 inch up to not greater than 50% of the diameter of the reaction zone; the reaction zone may be of a length in the range of about 10 to 25 feet; the temperature may be in the range of about 150 to 400° C., desirably 200 to 325° C., and preferably 220 to 280° C.; the pressure of the gaseous feed mixture at the inlet may be in the range of about 15 to 500 p. s. i. g., desirably 75 to 350, and preferably 150 to 225; the flow rate of the gaseous mixture may be in the range of 5 to 75 feet per second, desirably 10 to 60 and preferably 20 to 55; the residence time of the reaction mixture in the reaction zone may be in the range of about 0.1 to 6 seconds, desirably 0.3 to 2.5, and preferably 0.4 to 1.5; and the pressure drop from end to end of the reaction zone may be in the range of 3 to 50 p. s. i. g.

The catalyst may contain about 3 to 30% by weight silver. It may contain about 11 to 25% based on the weight of the silver of the organic carboxylate salt of an alkaline earth metal as promoter.

As to the gaseous reaction mixture, it should contain 3 to 20% oxygen, desirably 4 to 10 and preferably 5 to 8, 0.5 to 10% ethylene, desirably 1.5 to 7% and preferably 1.5 to 5%, and the remainder inert gases, e. g., up to about 10% carbon dioxide and the remainder nitrogen. The outlet gas from the reactor may contain 0.1 to 8% ethylene and 0.1 to 3.0% ethylene oxide.

The ethylene gas is preferably substantially free of other combustible materials or hydrocarbons. However, ethylene gas containing a substantial proportion of paraffins of 1 to 2 carbon atoms may be used. The parffins tend to increase the tendency toward total combustion of that part of the ethylene which is reacted; and accordingly, a chlorinated biphenyl vapor may be blended with the reaction mixture in a small proportion sufficient to counteract this effect of the paraffins. The chlorinated biphenyl may have a boiling point in the range of 380 to 460° C., preferably 400 to 430° C.

The pressure of the reaction mixture should be sufficiently high to provide the desired high output of ethylene oxide from the reaction system. However, if the pressure is too high, there is a tendency towards polymerization or other undesirable reactions which may coat the catalyst with an undesirable waxy or resinous layer which destroys the effectiveness of the catalyst. It is desirable that the pressure drop from end to end of the reactor tubes be kept at a minimum; and, from this viewpoint, the substantially regular spherical shaped catalysts used in the present system are markedly superior to irregular shaped catalysts, inasmuch as the latter are associated with a very much higher pressure drop. When the pressure drop becomes too high, the cost of the power requirements associated therewith make such an operation disadvantageous from the economic viewpoint.

The reaction mixture, temperature, catalyst, and contact time or space velocity of the gaseous mixture are interrelated and suitable combinations thereof are selected to give the desired optimum output and concentration of ethylene oxide in the exit gas.

Inasmuch as the desired formation of ethylene oxide is only one of the many reactions or effects which may occur upon subjecting the mixture of ethylene and oxygen to contact with the catalyst at elevated temperatures, it has been regarded as convenient to refer to the percentage of ethylene consumed in the reaction step relative to the feed as "conversion," and the percentage of ethylene oxide formed relative to the ethylene consumed as "selectivity." The yield of ethylene oxide relative to the ethylene feed is the product of the "selectivity" times the "conversion," e. g., on a mol basis. These percentage ethylene effects and terms may be represented as follows:

Ethylene plus oxygen gives:
 A. ethylene oxide (desired).
 B. carbon dioxide and water (not desired).
 C. unreacted ethylene plus oxygen (not desired).
Selectivity is:
$$\frac{A}{A+B}$$
Conversion is:
$$\frac{A+B}{A+B+C}$$
Yield is:
$$\frac{A}{A+B+C}$$

The foregoing are indicated as major considerations. However, as undesirable effects to be avoided, it may be noted that the ethylene oxide formed should not be rearranged to acetaldehyde, which would be an undesirable side product, or which might be further oxidized; and, of course, the ethylene oxide formed should not be further oxidized to give carbon dioxide and water.

It is indeed surprising that ethylene oxide may be produced with such high output efficiencies in accordance with the invention, especially when one keeps in mind the many undesirable effects or side reactions that may occur during or simultaneously with the desired partial oxidation reaction.

In view of the foregoing disclosures, variations, and modifications thereof will be apparent to one skilled in the art and it is intended to include within the invention all such variations and modifications except as do not come within the scope of the appended claims.

I claim:

1. A process for the preparation of ethylene oxide by the direct partial oxidation of ethylene which comprises passing a gaseous reaction mixture of ethylene and oxygen through a reaction zone at a temperature in the range of 150 to 400° C., said zone containing catalyst particles of a refractory inorganic support coated with active silver, said coated particles being substantially equivalent in size, all of the said particles in any cross-sectional region of said zone being of substantially equal activity, the activity of the particles in said zone being such that the zone is of increasing activity in the direction of travel of the gaseous reaction mixture therethrough.

2. A process of claim 1 wherein the catalyst coating consists of silver in admixture with a material selected from the group consisting of the oxides, peroxides, hydroxides, and salts of the alkali and alkaline earth metals.

3. A process of claim 2 wherein the temperature is in the range of 258 to 276° C. and the catalyst is arranged in a plurality of sub-zones of different activity, each of said sub-zones being of substantially equivalent activity throughout, the sub-zones being arranged in order of increasing activity in the direction of travel of the gaseous reaction mixture therethrough.

4. A process of claim 3 wherein the catalyst has a fused alumina support.

5. A process of claim 4 wherein the catalyst contains a barium compound.

6. A process of claim 4 wherein the catalyst contains a calcium compound.

7. A process of claim 3 wherein the catalyst has a mullite support.

8. A process of claim 7 wherein the catalyst contains a calcium compound.

References Cited in the file of this patent

UNITED STATES PATENTS

| | | |
|---|---|---|
| 2,393,240 | Dreyfus | Jan. 22, 1946 |
| 2,458,266 | Heider | Jan. 4, 1949 |
| 2,615,900 | Sears | Oct. 28, 1952 |